Patented Nov. 8, 1927.

1,648,595

UNITED STATES PATENT OFFICE.

WILLIAM K. SCHWEITZER, OF CLEVELAND, OHIO, ASSIGNOR TO THE GRASSELLI CHEMICAL COMPANY, OF CLEVELAND, OHIO, A CORPORATION OF OHIO.

INSECTICIDE.

No Drawing.  Application filed September 29, 1924.  Serial No. 740,635.

This invention relates to the preparation of brown colored products containing an arsenate of manganese and suitable for use as insecticides.

In an application Serial Number 654,781, filed July 30, 1923, in the name of Wellington Lee Tanner there is described a method for the preparation of manganese arsenate involving generally the interaction of a higher oxid of manganese, such as manganese dioxid, and arsenious oxid in the presence of water.

In another application Serial Number 740,626, filed Sept. 29, 1924 in the name of Harry P. Corson, there is described a method for the preparation of brown colored products suitable for use as insecticides, involving generally the treatment of an arsenate or arsenates of manganese or materials containing the same, such as the reaction product of manganese dioxid and arsenious oxid with a basic material such as lime in the presence of water.

The formation of manganese arsenate by the interaction of manganese dioxid and arsenious oxid in the presence of water is indicated in the following equation:—

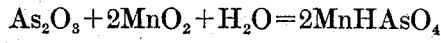

$$As_2O_3 + 2MnO_2 + H_2O = 2MnHAsO_4$$

The dimanganoarsenate of this reaction is white but the reaction product may be gray or even black with perhaps some brown coloration due to the presence in it of uncombined manganese dioxid and impurities or decomposition products.

The conversion of manganese arsenate to a brown colored product by treatment with an alkaline material such as lime in accordance with the process described in the Corson application referred to is explained as follows: The alkaline agent, for instance calcium hydroxide, reacts with the arsenate liberating manganese hydroxid, which then oxidizes with or without dehydration, forming brown colored hydroxides or hydrated oxides of manganese.

Now I have found that brown colored products containing an insoluble compound or compounds of manganese and arsenic and suitable for use as insecticides may be prepared in a single operation by bringing about the formation of manganese arsenate in the presence of an alkaline agent such as calcium hydroxide.

The process of my invention consists generally in heating and agitating a mixture of compounds of manganese and arsenic capable of reacting to form an arsenate or arsenates of manganese and an alkaline agent capable of forming manganese hydroxid from manganese arsenates in an aqueous medium.

The invention is illustrated by the following example of a specific procedure in accordance with my invention:

A charge prepared by mixing 100 pounds of finely divided pyrolusite containing 14.3% of avaliable oxygen, 90 pounds of commercial white arsenic of 98.7% purity, 10 pounds of lime and 1500 pounds of water is heated and maintained at the boiling temperature with constant agitation in an open vessel for about 48 hours, after which the solids are separated, washed, dried and ground to a powder. The product so prepared is a brown powder resembling cocoa and contains about 40% total $As_2O_5$ and about 2.5% water soluble $As_2O_5$.

The foregoing example represents a preferred procedure in accordance with my invention, but it is to be understood that the invention is not limited to the specific details thereof.

In place of pyrolusite I may use other oxidized manganese ores containing manganese dioxid or pure manganese dioxid or the other higher oxids of manganese such as $Mn_2O_3$ and $Mn_3O_4$ or mixtures of two or more of the higher oxids of manganese or materials containing the same, pyrolusite being preferred on account of its cost and availability, and in place of commercial white arsenic I may employ pure arsenious oxid. Or the formation of the arsenate of manganese may be accomplished by the interaction of non-oxidizing compounds of manganese such as the monoxid or carbonate with arsenic oxid or acid, or of such non-oxidizing compounds of manganese with arsenious oxid in the presence of an oxidizing agent. It is noted however that the manganese and arsenic compounds used should be mixed in combining proportions. In the case of pyrolusite and white arsenic, if the pyrolusite is present in the reaction mixture in excess of the amount capable of reacting with the arsenious oxide to form dimanganoarsenate, the product will be contaminated by unconsumed manganese dioxid in the form of black particles which the brown color of the product will not hide, and if the arsenious oxid is in excess it will be extremely difficult to reduce the soluble arsenic content of the product to the desired figure by washing. The manganese dioxid and arsenious oxid content of the reaction mixture should be in substantially the proportion of 174 to 198.

In place of lime or calcium hydroxide I may employ as the alkaline agent any alkali which is sufficiently strong to decompose manganese arsenate and form manganese hydroxide. Sodium and potassium hydroxides may serve to develop the brown color in the product, but their use is objectionable in that they form soluble arsenates which must be washed out of the solid reaction product before it can be used for insecticidal purposes. The preferred alkaline agent therefore is one which forms an insoluble or only slightly soluble arsenate, and I therefore prefer to use lime or burned dolomite.

The alkaline agent is used in quantity sufficient to develop the desired depth of color preferably within the time required for the formation of the arsenate. In general the greater the quantity of the alkaline agent used the more rapid is the development of the color and the darker is the color of the final product. In the case of lime used in connection with pyrolusite and white arsenic as in the foregoing example, a practical range of variation is from 2% to 10% of the combined weights of the pyrolusite and white arsenic. Less than two percent of lime is insufficient to complete the color development within the time required for the interaction of the pyrolusite and white arsenic. With from 2% to 10% of lime the color of the final product becomes darker as the quantity of lime is increased. The use of lime in quantity amounting to more than 10% apparently is without effect either upon the rate of reaction between the pyrolusite and the white arsenic or upon the color of the product.

The time required for the completion of the reaction between pyrolusite and white arsenic under the conditions specified in the example or equivalent conditions is about 48 hours. The reaction may be carried out either at a temperature below the boiling point of water, in which case however the reaction rate is slower, or at a temperature above the boiling point of water by the use of superatmospheric pressure.

The quantity of water to be used in the reaction mixture is determined by two factors. If too small a quantity of water is used the charge will thicken as the reaction proceeds, becoming so stiff as to interfere with its thorough agitation, and pockets of unreacted material may result. On the other hand, if too much water is used the reaction rate is reduced. For the reaction between pyrolusite, white arsenic and lime I have determined the preferred quantity of water to be from 10 to 15 times, preferably slightly more than 10 times, the weight of the pyrolusite in the charge.

Another factor to be taken into consideration in the carrying out of my process is the nature of the reaction vessel. The reaction proceeds satisfactorily as described in the example in a reaction vessel of glass, porcelain or the like, but is practically inoperative, or at least extremely slow, in a reaction vessel formed of either lead or iron.

As has been indicated, the development of the brown color has been presumed to involve the oxidation of manganese hydroxid formed from the arsenate by the reaction of the alkaline agent and from this it may appear that a supply of an oxidizing agent is essential to the process; but I have found it to be unnecessary to supply an oxidizing agent or to make any special provision for the access of air. The reaction of course is carried out in the presence of air, but the injection of air into the reaction mixture does not apparently hasten the development of the brown color.

I claim:—

1. Process for the preparation of insecticides which comprises causing compounds of manganese and arsenic capable of forming an arsenate of manganese to react in the presence of an alkaline agent.

2. Process for the preparation of insecticides which comprises heating and agitating a mixture of manganese and arsenic compounds capable of forming an arsenate of manganese, in the presence of water and an alkaline agent.

3. Process for the preparation of insecticides which comprises heating and agitating a mixture of manganese and arsenic compounds capable of forming an arsenate of manganese, in the presence of water and calcium hydroxid.

4. Process for the preparation of insecticides which comprises heating a mixture of an oxidizing compound of manganese and arsenious oxid in the presence of water and an alkaline agent.

5. Process for the preparation of insecticides which comprises heating and agitating a mixture of manganese dioxid and arsenious oxid in the presence of water and an alkaline agent capable of forming manganese hydroxid from manganese arsenate and of forming an insoluble arsenate.

6. Process for the preparation of insecticides which comprises heating and agitating in an open non-metallic reaction vessel a mixture of pyrolusite, white arsenic, lime and water.

7. Process for the preparation of insecticides which comprises heating to boiling temperature with free access of air a mixture of manganese dioxid, arsenious oxid, lime and water.

8. Process for the preparation of insecticides which comprises heating to about 100° C. with free access of air in a non-metallic reaction vessel a mixture of about 174 parts by weight of manganese dioxid and 198 parts by weight of arsenious oxid with lime in quantity amounting to about 2% to 10% of the combined weights of the manganese dioxid and arsenious oxid and water in quantity amounting to from 10 to 15 times the weight of the manganese dioxid.

In testimony whereof, I affix my signature.

WILLIAM K. SCHWEITZER.